(12) United States Patent
Tunbjer (10) Patent No.: US 9,352,807 B2
(45) Date of Patent: May 31, 2016

(54) FLOATING PLATFORM AND ENERGY PRODUCING PLANT COMPRISING SUCH A FLOATING PLATFORM

(71) Applicant: Hexicon AB, Stockholm (SE)
(72) Inventor: Anders Tunbjer, Ekero (SE)
(73) Assignee: Hexicon AB, Stockholm (SE)
( * ) Notice: Subject to any disclaimer, the term of this patent is extended or adjusted under 35 U.S.C. 154(b) by 0 days.
(21) Appl. No.: 14/433,239
(22) PCT Filed: Oct. 4, 2013
(86) PCT No.: PCT/SE2013/051164
§ 371 (c)(1),
(2) Date: Apr. 2, 2015
(87) PCT Pub. No.: WO2014/055027
PCT Pub. Date: Apr. 10, 2014

(65) Prior Publication Data
US 2015/0259050 A1    Sep. 17, 2015

(30) Foreign Application Priority Data
Oct. 5, 2012   (SE) ........................................ 1251130

(51) Int. Cl.
*B63B 35/44* (2006.01)
*F03D 1/02* (2006.01)
*B63B 17/00* (2006.01)
*B63B 21/50* (2006.01)
*F03D 11/04* (2006.01)

(52) U.S. Cl.
CPC .................. *B63B 35/44* (2013.01); *B63B 17/00* (2013.01); *B63B 21/50* (2013.01); *F03D 1/02* (2013.01);
(Continued)

(58) Field of Classification Search
CPC ........ B63B 35/44; B63B 21/50; B63B 17/00; B65D 88/00; B65D 88/78
USPC .................................. 114/256, 254, 266, 267
See application file for complete search history.

(56) References Cited

U.S. PATENT DOCUMENTS

| 1,859,322 A * | 5/1932 | Wilson ................... | B65D 88/78 |
| | | | 114/256 |
| 3,327,667 A * | 6/1967 | Manning ................. | B63B 9/065 |
| | | | 114/256 |

(Continued)

FOREIGN PATENT DOCUMENTS

| DE | 32 24 976 A1 | 1/1984 |
| DE | 102 19 062 A1 | 11/2003 |

(Continued)

OTHER PUBLICATIONS

International Search Report for corresponding International Application No. PCT/SE2013/051164 dated May 2, 2014.

*Primary Examiner* — Lars A Olson
(74) *Attorney, Agent, or Firm* — Renner, Otto, Boisselle & Sklar, LLP (57) ABSTRACT

The invention relates to a floating platform (1) comprising at least three floating or semi-submersible peripheral units (2; 2a, 2b, 2c, 2d) arranged connected to a floating or semi-submersible central unit (3) by at least one in a substantially radial direction arranged rigid and elongated radial connection member (5). The floating or semi-submersible peripheral units (2; 2a, 2b, 2c, 2d) are connected to the adjacent peripheral units (2; 2a, 2b, 2c, 2d) by a coupling arrangement (6) which is an elongated object variable in length arranged to allow each floating peripheral unit (2; 2a, 2b, 2c, 2d) to move in relation to the adjacent peripheral unit (2; 2a, 2b, 2c, 2d) at least in a direction substantially parallel to the elongation direction of the coupling arrangement (6). One embodiment of the invention is characterized in that the length of at least one of the coupling arrangements (6) is arranged to be adjusted by a length adjusting arrangement (15) adapted to shorten the coupling arrangement (6) and to pull two adjacent floating peripheral units (2; 2a, 2b, 2c, 2d) towards each other. The invention also relates to an energy producing plant comprising such a floating platform.

14 Claims, 5 Drawing Sheets

(52) U.S. Cl.
CPC ........... *F03D 11/04* (2013.01); *B63B 2035/442* (2013.01); *B63B 2035/446* (2013.01); *F05B 2240/40* (2013.01); *F05B 2240/93* (2013.01); *F05B 2240/95* (2013.01); *Y02E 10/72* (2013.01)

(56) References Cited

U.S. PATENT DOCUMENTS 4,000,532 A * 1/1977 Nielsen .................. E02B 15/08
114/256

7,207,284 B2 * 4/2007 Smedal .................. B63B 11/02
114/256
2012/0139255 A1 6/2012 Zhu

FOREIGN PATENT DOCUMENTS

| EP | 1 106 825 A2 | 6/2001 |
|---|---|---|
| JP | 2007160965 A | 6/2007 |
| WO | 2011/071444 A1 | 6/2011 |

* cited by examiner

FLOATING PLATFORM AND ENERGY PRODUCING PLANT COMPRISING SUCH A FLOATING PLATFORM

This application is a national phase of International Application No. PCT/SE2013/051164 filed Oct. 4, 2013 and published in the English language, which claims priority to Application No. SE 1251130-9 filed Oct. 5, 2012.

TECHNICAL FIELD

The present invention relates generally to floating platform and an energy producing plant comprising such a floating platform. The energy producing plant comprises one or several energy producing systems, for example wind power generators, attached to the floating platform.

BACKGROUND

Utilizing renewable energy sources, such as winds and ocean waves, for creating electric power is becoming a more and more preferred energy producing system because it does not evaporate $CO_2$ into the atmosphere.

Most energy producing plants today utilizes only one renewable energy source, mainly wind. These energy producing plants comprise several wind power units placed as separate units on land or in the ocean. When placed in the ocean the units normally are moulded to the ocean bottom with concrete pillars. This requires relatively shallow water and is therefore a placement used close to shore, thus normally close to habited or recreational areas. This placement is not desirable from an environmental view.

To build wind power plants further out to sea meets the problem of a usual greater depth, but also the practical economical problem of supervision and maintenance. Due to the fact that wind power plants up to today uses separate wind generator units, a placement further out to sea quickly becomes uneconomical.

The principle of placing an energy producing plants out on the ocean has the advantage that it there is normally a more frequent and harder wind. An energy producing plant placed out on the ocean can also be used as a platform for other types of energy converting systems, such as for example wave and sun energy converters.

However, an energy producing plant placed out on the ocean is exposed to hard wind and harsh weather. Thus, it is necessary that all components of the plant are durable and that the construction itself is rigid. It must also be easy to supervise and maintain.

In the applicant's previous application WO2011071444A1 such an energy producing plant is described. This plant is a floating platform comprising a frame work constructed of hollow pipes/beams connected by nodes. On each node a wind generator is placed. Each pipe/beam is sealed in its respective end and forms separate floating parts adapted to be connected to the nodes. Further, the volumes within each floating part, i.e. beams and nodes, are connected to each other. I.e. nodes and pipes/beams are connected so that the pipes/beams form transport paths between the nodes. The space in these parts can be used as transport paths, workshops, storage rooms, accommodations or provide space for other functions.

When the floating platform is exposed to the power of nature, all components are exposed to large forces which may result in large stress on the components, especially in the connection between the beams and nodes. Therefore all components must be correctly dimensioned. Thus, the size and price of the components and the entire platform increases.

In DE10219062A1 another floating platform comprising separate floating parts connected to each other in separate attachment points. The floating parts are able to articulate in relation to each other around a vertical axis arranged through the attachment points. However, the vertical forces from the waves are still risking damaging this attachment.

Another floating structure is disclosed in JP2007160965A. Here several separate floating structures are connected with tensioning parts in order to maintain a certain distance between each floating structure and to decrease manufacturing cost by replacing the ridged beams between each platform with the tensioning parts. However, these tensioning parts are not possible to adjust in any way.

SUMMARY OF INVENTION

An object of the present invention is to create a durable and cost effective floating platform which can be mounted far out in the ocean and which can be used as a platform for an energy producing plant comprising one or several energy converting systems, for example a plurality of wind power generators attached to the platform. The floating platform shall be easy to manufacture, transport to and assemble at its location far away from shore. This floating platform is described in claim 1.

The invention relates to a floating platform comprising at least three floating or semi-submersible peripheral units arranged connected to a floating or semi-submersible central unit by at least one in a substantially radial direction arranged rigid and elongated radial connection member. The floating or semi-submersible peripheral units are connected to the adjacent peripheral units by a coupling arrangement which is an elongated object variable in length arranged to allow each floating peripheral unit to move in relation to the adjacent peripheral units at least in a direction substantially parallel to the elongation direction of the coupling arrangement. One embodiment of the invention is characterized in that the length of at least one of the coupling arrangements is arranged to be adjusted by a length adjusting arrangement adapted to shorten the coupling arrangement and to pull two adjacent floating peripheral units towards each other.

The coupling arrangement is constructed to allow movement between the floating peripheral units and to create a tension force pulling the floating peripheral units towards each other. When a slight movement is allowed, the forces in the structure and its attachment points are decreased. When using an elongated object the peripheral units can be arranged in a pattern creating a hexagon shape with one center node. This creates a natural optimized balanced structure. However, other shapes are of course also possible. Further, when the coupling arrangement is adjustable in length the assembly process of the separate floating units far out from shore is simplified. It is also possible to re-tension the coupling arrangements after some time, thus increasing the life of the floating platform.

In one embodiment the coupling arrangement is a flexible wire, cord, cable, rope or similar object.

In another embodiment the length adjusting arrangement is a winch comprising a winch drum where the coupling arrangement is arranged to be upwinded and rotation means is arranged to rotate said winch drum.

The rotation means may be powered by one of the following: electric, hydraulic, pneumatic or internal combustion drives.

Attaching a winch to one of the floating peripheral units, arranged to wind up and unwind a coupling arrangement, such as for example a flexible wire, connecting two adjacent floating peripheral units is a convenient yet effective way to pull the peripheral units towards each other, thus to pre-tension the entire platform while still allowing the separate units to move in relation to each other.

In another embodiment at least one of the coupling arrangements have a length of at least two times the nominal distance between the adjacent peripheral floating units.

Due to the properties of coupling arrangement, when being a flexible wire, cord, cable, rope or similar object; the longer it is, the more movements and energy it can absorb. Thus, stress in the structure may be decreased. Thus, a length at least twice the nominal and optimized distance between the peripheral units is desirable, preferably the length of the coupling arrangement is even longer, for example between two and ten times the nominal distance.

In one embodiment, the coupling arrangement is arranged to run back and forth between the adjacent peripheral floating units at least one time.

One way of applying a coupling arrangement with a length longer than the nominal distance between two points is to let it run back and fourth between the points, thus "sewing" the points together. The flexible properties of the coupling arrangement can then be entirely used. It is of course also possible store a certain length of the coupling arrangement near either attached point, for example by upwinding it on a winch drum or similar.

In yet another embodiment the at least one of the coupling arrangements is a mechanical arrangement comprising at least two parts arranged telescopically moveable in relation to each other.

The coupling arrangement may then be attached to the respective peripheral unit with an articulated joint.

A telescopic arrangement is also possible to adjust in length by pulling the telescopic parts together by a length adjusting device. In this case for example an engine of some kind. If an articulated joint is used between the coupling arrangement and the peripheral units movements of the separate peripheral units in relations to each other is possible.

Thus, in order to allow a relative movement between the separate peripheral units both in a direction parallel to the coupling arrangement and in other directions such as the vertical direction, either the coupling arrangement itself is flexible, for example by using a rope or similar, or a telescopic mechanical arrangement is used where the distal ends of the coupling arrangement can be attached articulately to the respective peripheral unit, preferably with a joint arrangement.

In another embodiment, each floating peripheral unit comprises at least one semi-submersible node acting as a connection point for at least one coupling arrangement and at least one radial connection member.

When using a node, preferably having the shape of a hollow cylinder, as a connection point the construction is simplified and each part of the platform can be build on land. It is also possible to use the interior of the node as a transport path or for storage.

In yet another embodiment, each floating peripheral unit comprises at least two semi-submersible nodes connected to each other by a rigid elongated peripheral connection member.

When assembling several nodes and connection members together, an elongated floating unit is formed. Thus, in the platform, at least one length adjustable and flexible coupling arrangement can be said to be replaced with a connection member. This creates a more rigid construction better adapted to be used as an energy producing plant. It is also possible to use floating units comprising more than three nodes wherein all nodes are connected with a connection member. Assembling more than three nodes into a floating unit creates a larger, more stable platform on which several energy producing systems/wind generators can be mounted.

In another embodiment, the radially arranged connection members have a connection coupling in at least one end, connecting the radial connection members with the central unit and/or the peripheral floating units and enabling relative movement between the central unit and peripheral floating units.

Enabling a movement between the central and peripheral units further decreases the stress in the structure. The connection coupling is preferably a pivot coupling device creating a pivotal movement of connection members around a substantially horizontal rotation axis. However, the connection coupling may also be configured to further allow movement around a substantially vertical axis or an axis arranged in other direction. It is also possible to use an attachment device allowing a fully articulating movement. A sealable opening may also be arranged through the connection coupling. Thus, a possible transport route between the floating units through the inner volume of the connection members and nodes is created. The invention further relates to an energy producing plant comprising; a floating platform according to the above described, an energy producing system and an anchoring system arranged to anchor the floating platform to the bottom of an ocean.

The energy producing system which is used may be at least one of; a wind power generator, wave power generator, sun cell or wind shovels.

Each floating peripheral unit of the energy producing plant may also comprise at least one semi-submersible node on which a wind power generator is mounted.

Using the inventive platform as a base for an energy producing plant is particularly of interest since the platform is very well suited for this application, due to the fact that it can operate independent of depth and far out on the open ocean. The platform can be firmly anchored at the bottom by the anchoring system. Preferably the anchoring system is attached to the central unit, thus enabling the entire platform to rotate and automatically adjust in line with the wind and/or water current direction so that the energy producing systems are placed in an optimum position for energy extraction. When wind power generators are used they can be placed on the semi-submersible nodes of the platform, thus enabling access to the generator housing through the hollow interior of the nodes and the connection members.

BRIEF DESCRIPTION OF THE DRAWINGS

The invention is now described, by way of example, with reference to the accompanying drawings, in which.

Observe that all embodiments or part of an embodiment can be combined in any way.

DESCRIPTION OF EMBODIMENTS

Embodiments will now be described in more detail with reference to the accompanying drawings. All examples herein should be seen as part of the general description and therefore possible to combine in any way in general terms. Again, individual features of the various embodiments and methods may be combined or exchanged unless such combination or exchange is clearly contradictory to the overall function of the floating platform.

Figure 1A:
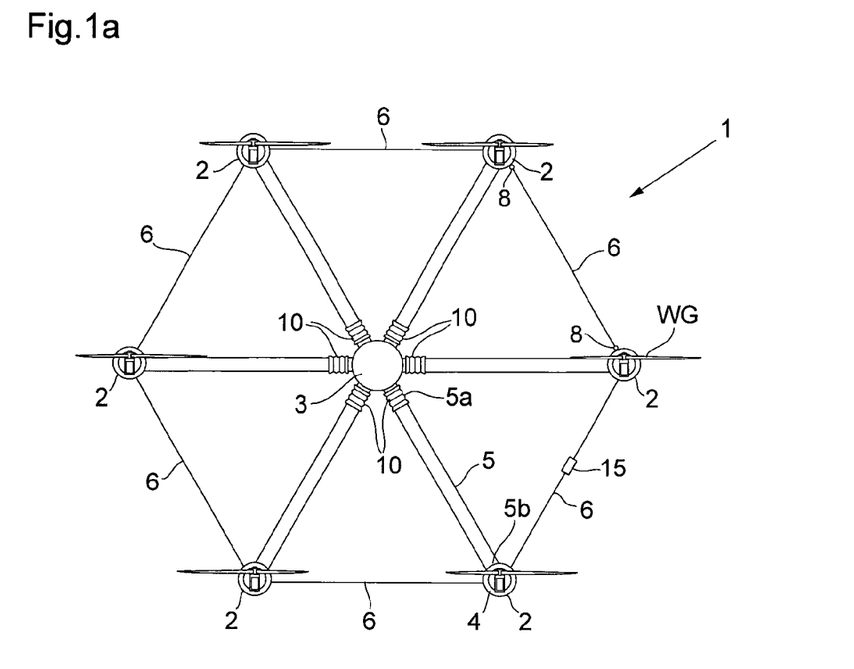
FIG. 1a disclose a top view of a first embodiment of the invention

One first embodiment of the floating platform used as an energy producing plant is disclosed in FIG. 1a. FIG. 1a discloses a floating platform 1 comprising six floating or semi-submersible peripheral units 2 arranged detachably connected to a central floating or semi-submersible unit 3. Each floating peripheral unit 2 is in this embodiment a semi-submersible node 4 on which a wind power generator WG is mounted. However, it is also possible to arrange other types of energy converting systems on the platform.

Between the peripheral units 2 and the central unit 3 an elongated, rigid radial connection member 5 is arranged protruding in a substantially radial direction from the central unit 3. The connection between the peripheral and central units 2, 3 and the connection members 5, may be detachable by a connection coupling 10 or rigid, i.e. the connections member can be welded or in any other way firmly attached to the peripheral and/or central units 2, 3.

In the embodiment according to FIG. 1a, the radial connection member 5 is in its proximal end 5a attached to the central unit 3 by a detachable connection coupling 10, enabling relative movement between the central and peripheral units 3, 2, and in its distal end 5b it is firmly attached to the peripheral units 2.

The floating or semi-submersible peripheral units 2 are connected to each other by an elongated coupling arrangement 6 variable in length allowing each floating peripheral unit to move in relation to the other at least in a direction substantially parallel to an elongation direction of the coupling arrangement 6. The coupling arrangements 6 are connecting one node 4 of each floating peripheral unit 2 with a node 4 of another floating peripheral unit 2 and are constructed to allow movement between the peripheral units 2 and to create a tension force pulling the floating peripheral units 2 towards each other. Thus, the coupling arrangement 6 is an elongated object variable in length either by means of usage of an elastic material stretching and retracting in length and/or by using a separate length adjusting device 15. When shortening the coupling arrangement the peripheral units 2 are pulled together pre-tensioning the entire platform. The elastic properties of the coupling arrangement itself absorb/dampen the forces created by the waves.

In FIGS. 1a, 1b, 2, 3 and 4, the coupling arrangement 6 is a flexible wire, cord, cable, rope or similar, but it can also be a not disclosed length adjustable rigid mechanical arrangement. For example an arrangement comprising at least two parts arranged telescopically moveable in relation to each other.

To allow a relative movement between the separate peripheral units 2, either the coupling arrangement 6 itself is flexible, for example by using a rope, or if a rigid mechanical arrangement is used, its distal ends can be attached to the respective peripheral unit 2 with an articulated joint 8.

Figure 1B:
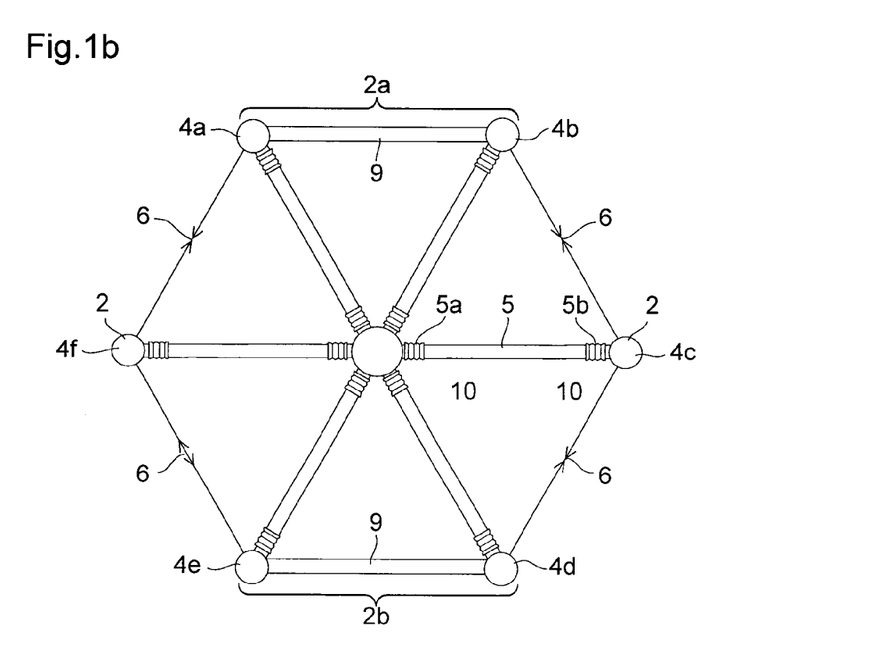
FIG. 1b disclose a top view of a second embodiment of the invention

FIG. 1b discloses a second embodiment of the invention. Here at least two of the peripheral floating units have the form of nodes 4a, 4b; 4d, 4e, connected to each other by a node connecting peripheral connection member 9. Thus, the peripheral floating unit is forming a structure 2a, 2b with a peripheral extension direction. The nodes 4a, 4b; 4d, 4e act as a connection point for at least one coupling arrangement 6 and at least one radial connection member 5.

The node connection member 9 and the nodes 4a, 4b; 4d, 4e together form the peripheral floating node units 2a, 2b. The peripheral floating node units 2a, 2b are attached to the central unit 3 by at least one radial connection member 5 arranged in a substantially radial direction from the central unit 3. The radial connection member 5 is in its proximal and distal end 5a, 5b attached to the central unit 3 by a connection coupling 10, enabling relative movement at least in the vertical direction, between the central and peripheral units 3, 2, see FIGS. 4, 5a and 5b.

In FIG. 1b, one radial connection member 5 is connected to each respective node 4a, 4b; 4d, 4e of the peripheral floating units 2a, 2b, and a triangle shaped construction is created. This triangle shape contributes with extra stability and torsional rigidity to the construction because the pulling forces created by the coupling arrangement 6 between the peripheral units 2 create a force vector transmitted to the central unit 3 via the radial connection members 9. However, it is also possible to use only one radial connection member 9 connecting the peripheral units 2 to the central unit 3.

In the embodiment shown in FIG. 1b, the distally arranged attachment couplings 10 are attaching the connection members 5 with the respective nodes 4a, 4b; 4d. However, it is also possible to attach the radially arranged radial connection member 5 directly to the peripheral connection member 9. See FIG. 2. Preferably, the attachment coupling 10 allows a movement between the radial connection member 5 and the node 4 and/or the peripheral connection member 9. For example a pivoting movement around an essentially horizontal axis, as explained above and in FIGS. 4, 5a and 5b.

Each peripheral floating unit 2a, 2b is connected to the adjacent floating units 2 by a coupling arrangement 6 allowing each peripheral floating unit to move in relation to the other at least in a direction substantially parallel to an elongation direction of the coupling arrangement 6. The coupling arrangements 6 are connecting one node 4a, 4b; 4d, 4e of each floating peripheral node unit 2a, 2b with a node 4 of another floating peripheral unit 2 and are constructed to allow movement between the nodes 4 and to create a tension force pulling the floating peripheral units 2 towards each other, as described in the description of FIG. 1a. It is also possible to exchange one or both of the floating peripheral unit 2 with floating peripheral node units 2a, 2b, 2c, 2d comprising more than one node connected by connection members, as described in FIGS. 2 and 3.

The plant in FIGS. 1a and 1b is preferably in the shape of a hexagon with one central unit/node 3. However, other shapes are also possible. The connection members 5 is in one embodiment hollow steel beams or pipes, approximately 5-15 meters in diameter or cross section, but may also be arranged as a frame work construction. The radially arranged radial connections members 5 have a length of approximately 100-300 meters or more while the node connecting peripheral connection members 9 have a length of approximately 50-200 meters or more. The radial and peripheral connection members 5, 9 may be circular, rectangular or have any other suitable shape. The connection members may be arranged floating on or partly or fully submerged under the water surface or may comprise two or more sets of, in the horizontal direction, essentially parallel connection members arranged as a frame work. The semi-submersible nodes 4 may be a cylinder, rectangular, hexagonal or other shaped, partly submerged, arrangement, approximately 20 meters in diameter or cross section and approximately 30 meters high.

Figure 2:
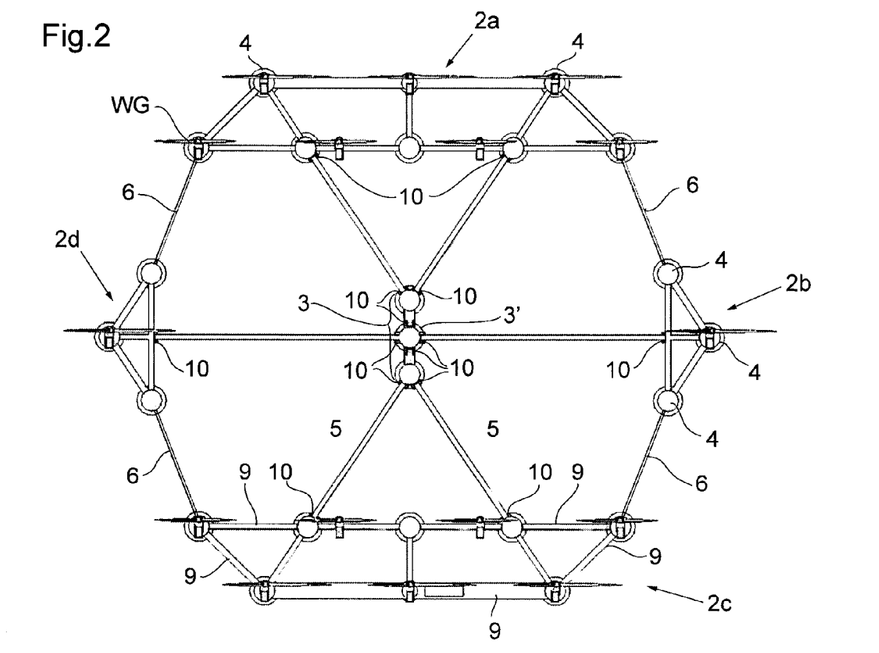
FIGS. 2 and 3 disclose a top and a perspective view of a third embodiment of the invention.
Figure 3:
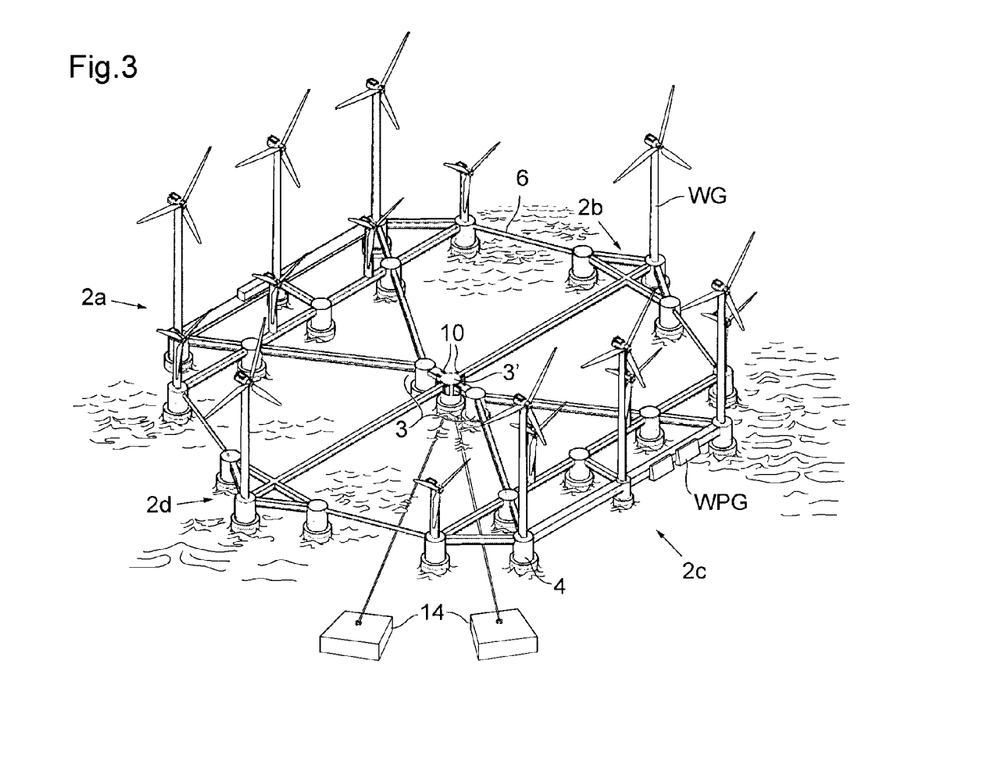

FIGS. 2 and 3 disclose a third and preferred embodiment of the invention. Here the platform comprises a central floating node unit 3 and four floating peripheral units 2a, 2b, 2c, 2d, each comprising at least three semi-submersible nodes 4 connected to each other by a set of peripheral connection members 9. The separate peripheral connection members 9 may be arranged floating on or partly or fully submerged under the water surface or may comprise two or more sets of, in the horizontal direction, essentially parallel connection members. The central unit 3 is in this embodiment assembled by three connected nodes 4. The central node 3' in the central unit 3 may act as a hub around which the whole platform 1 can rotate.

In this embodiment, the set of peripheral connection members 9 and the nodes 4 together form four rigid and stable floating units/node units 2a, 2b, 2c, 2d. The floating node units 2b and 2d comprise more than three nodes and all adjacent nodes of each unit are connected with at least one peripheral connection member 9. Assembling more than three nodes into a floating node unit creates a larger platform on which several energy converting system/wind generators can be mounted. It is also possible to mount additional wind generators of different size or other energy producing units such as wave energy converters directly on the radial and/or peripheral connection members 5, 9.

Each floating unit, both central and peripheral, 3, 2a, 2b, 2c, 2d is easily towed to the predetermined location out in the ocean and assembled on site. The peripheral floating node units 2a, 2b, 2c, 2d are connected with the central unit 3 with at least one radially arranged radial connection member 5. In each end 5a, 5b of the radial connection member 5, a connection coupling 10 may be arranged which allow certain pivotal moment between the connection member 5 and the central and peripheral units 3, 2a, 2b, 2c, 2d. Each peripheral floating node unit 2a, 2b, 2c, 2d are connected to each other by a coupling arrangement 6 allowing each peripheral floating node unit to move in relation to the other, as described above.

Due to the floating properties of the floating unit, it can operate independent of the depth. It can be anchored at the bottom, for example with an anchoring system 14 used for large marinas. The anchoring system 14 emanates from a rotatable hub 3' arranged in the central floating unit 3 with for example three to eight laterally extending anchoring attachments. The central floating unit 3 is through the anchoring attachments firmly anchored at the bottom and the entire construction can rotate around the hub in the central floating unit. Thus, the entire construction is able to rotate freely 360 degrees and automatically adjust in line with the wind direction so that the firmly attached wind propellers always are placed in an optimum position. Preferably, this is done by mounting wind rudders and/or pod propellers on the platform. Preferably on its rear part in relation to the wind direction, but other placements are also possible.

The floating platform according to the invention may also be supplemented and optimized with other energy producing systems, such as for example wave power generators WPG, sun cells and vertical or horizontal wind shovels rotating around its own axis, thus can use the incoming wind blowing below the lowest position of the propellers. Furthermore, it is possible to utilize the vertical movements in the sea of the entire platform for energy extraction. If wave power energy converters WPG are used they are preferably placed along the outside of the plant on the side directed towards the waves.

Figure 4:
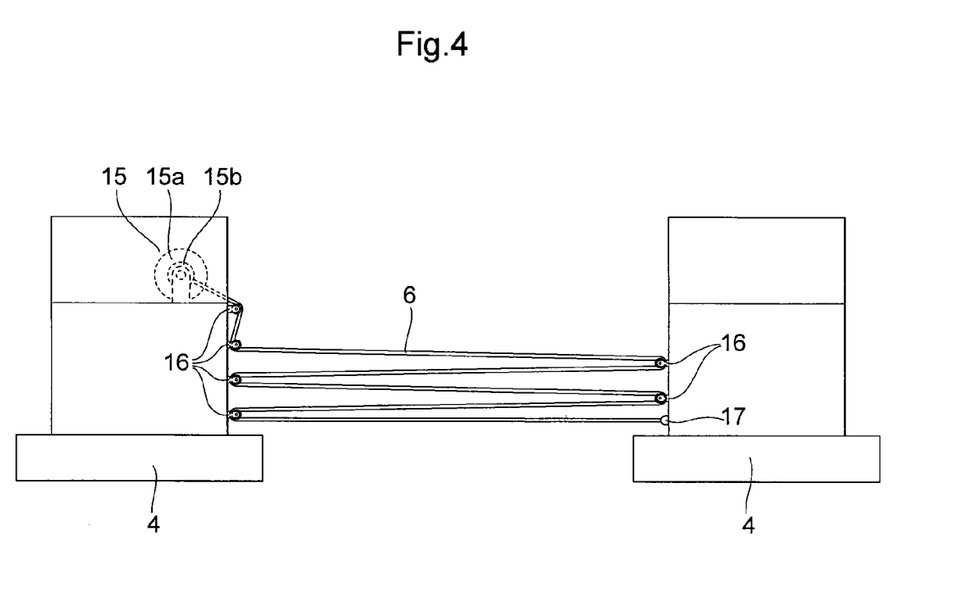
FIG. 4 disclose a detail view of the coupling arrangement.
Figure 5:
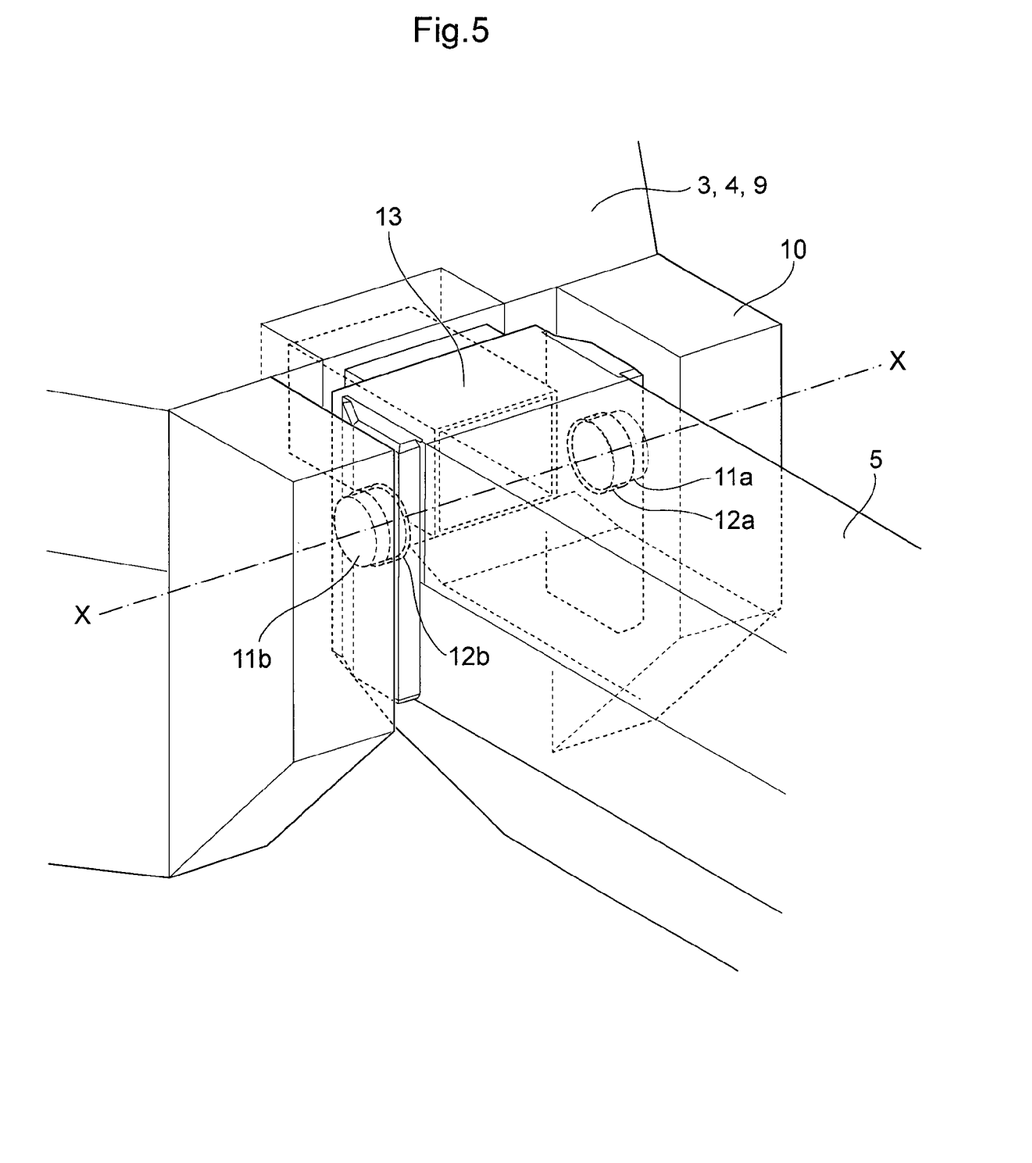
FIGS. 5, 6a and 6b disclose a detail view of a connection coupling.

In FIG. 4 one embodiment of the coupling arrangement 6 is disclosed. Here the coupling arrangement 6 is a rope, for example made of polyethylene fiber, for example of the brand Dynema®, but it can also be a wire, cord, cable or rope. The length of at least one of the coupling arrangements 6 is possible to adjust by a winch or a similar mechanical length adjusting device 15 used to pull in (wind up) or let out (wind out) or otherwise shorten, lengthen and adjust the tension of a wire, cord, cable or rope. The length adjusting device 15 may comprise a spool or winch drum 15a and rotation means 15b, for example gear assemblies powered by for example electric, hydraulic, pneumatic or internal combustion drives. In one embodiment the length adjusting mechanical device 15 may include a solenoid brake and/or a mechanical brake or ratchet and pawl device that prevents it from unwinding unless the pawl is retracted.

In the embodiment according to FIG. 4, the length adjusting device 15 is a winch mounted at one of the nodes 4 of a peripheral unit 2 or node unit 2a, 2b, 2c, 2d. The rope 6 connects one node 4 of a floating peripheral unit 2 with a node 4 of another adjacent floating peripheral unit 2. The rope 6 is in one end firmly attached at a joint 17 to one node and in the other end of the rope the length adjusting device 15 is arranged. The rope 6 can be winded up on the winch drum 15a and tensioned by the powered gear assembly 15b. Thus, the length adjusting device 15 creates a tension force in the rope, pulling the connected floating peripheral units 2 towards each other. The joint 17 and the length adjustment device 15 can be attached to the same node or attached to a node or other parts of the structure of an adjacent peripheral unit 2, depending on the length of the rope.

The rope 6 may be thread over and run on at least one roller 16 or similar device attached to the nodes. In this embodiment two rollers 16 are attached to one node and four rollers 16 are attached to the other opposite node. Thus, the rope runs back and forth between the nodes five times, i.e. sewing the nodes and the peripheral units together. Due to the elastic properties of the rope 6; the longer the rope, the more movements it can absorb. Thus, a length at least twice the nominal and optimized distance between the peripheral units is desirable, preferably the length of the rope is even longer, for example between four and ten times the nominal distance. Consequently, the rope 6 may have a length of at least two times and up to ten times the nominal distance between the nodes 4. Preferably the rope has a length six times the nominal distance between the nodes. The nominal distance between the peripheral units can be said to be the distance between the peripheral units 2; 2a, 2b, 2c, 2d when no external forces act on the platform and when essentially no tension is found in the coupling arrangement, i.e. for example the described rope.

If a mechanical arrangement comprising two or more telescopic parts moveable in relation to each other is used as at least one coupling arrangement 6, the length adjusting device 15 may be an engine or similar, creating a controlled relative linear movement between the separate telescopic parts. The separate telescopic parts may also be connected by a spring, damper or a similar arrangement absorbing the energy and forces created by the waves.

Figure 6A:
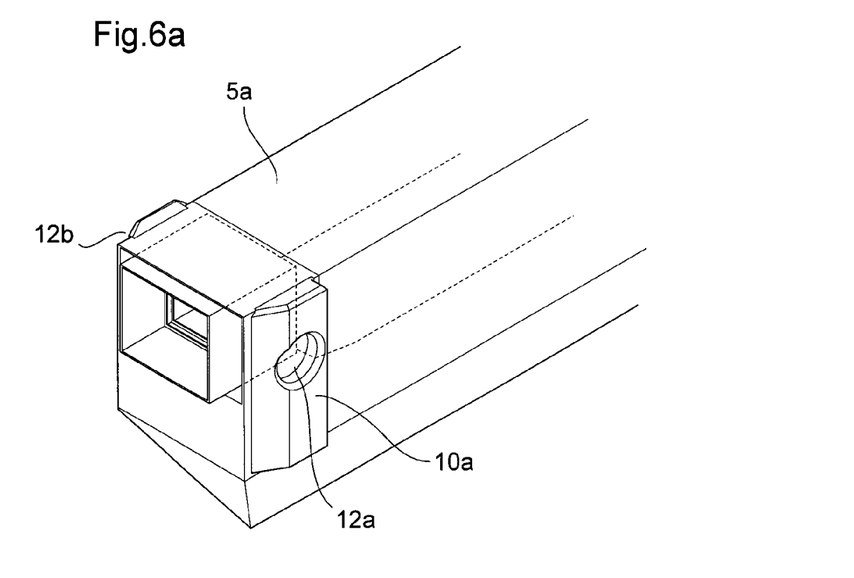
Figure 6B:
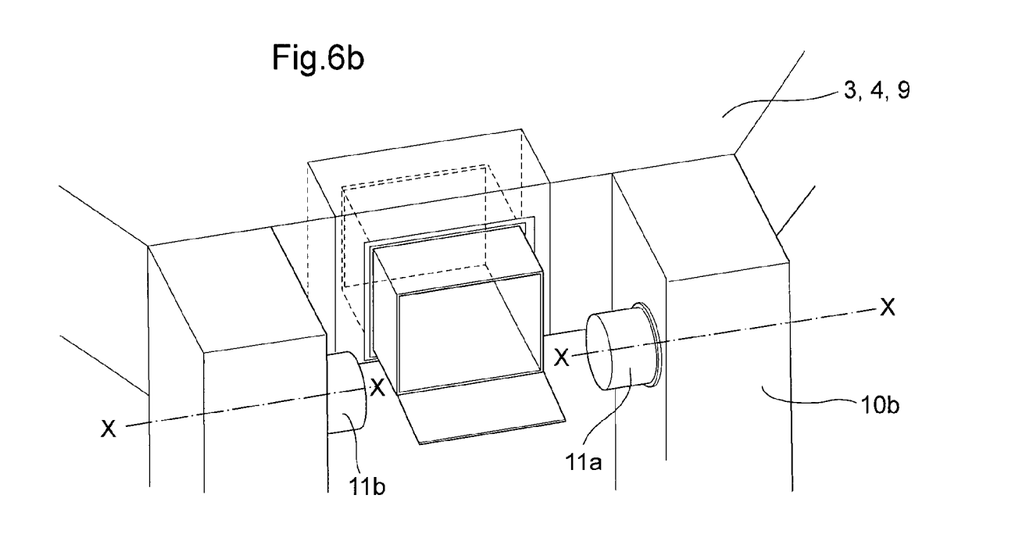

In FIGS. 5, 6a and 6b a detail view of the connection coupling 10 enabling relative movement between the central and peripheral units 3, 2 is shown. The connection coupling 10 comprises a first coupling part 10a, arranged in respective end 5a, 5b of the radial connection member 5, connecting the radial connection members 5 with at least a second coupling part 10b arranged in central floating unit 3 or in a separate node 4 or a peripheral node connection member 9. The connection coupling 10 is preferably a pivot coupling device creating a pivotal movement of connection members 5 pivot around a substantially horizontal rotation axis x-x. However, the connection coupling 10 may also be configured to further allow movement around a substantially vertical axis or an axis arranged in other direction. It is also possible to use an attachment device allowing a fully pivoting movement.

The axis x-x runs centrally through two axially moveably locking means 11a, 11b. The locking means 11a, 11b are arranged on opposite sides of the connection member ends 5a, 5b and mounted either in the first or second coupling part 10a, 10b. The locking means 11a, 11b are adapted to interact with a respective cut out 12a, 12b arranged in the first or second coupling part 10a, 10b, respectively. When the connection coupling 10 is locked in position, it is sealed by a sealing and/or by a sealing surface which prevents medium such as water or air to be transported between the inner volume of the connection members/nodes and their surroundings.

The radial connection members 5 are preferably sealed in each end 5a, 5b forming a closed air filled unit which can float on water and be towed to the location where the energy producing unit shall be build. A sealable opening 13 may be arranged through the connection coupling 10. Thus, a possible transport route between the floating units through the inner volume of the connection members and nodes is created. It is of course also possible to design the peripheral connection members 9 as a closed air filled unit.

Consequently, besides creating strength and buoyancy to the construction, the radial connection members 5 (and possibly also the peripheral connection members 9) can also be used as connection paths, accommodation, workshops and storage rooms. It is also possible to arrange a lifting crane or similar device on the radial and/or peripheral connection members 5, 9 in order to perform assembly, care and maintenance of the plant. The lifting crane and other large details, such as spare parts, can be transported between the wind generator towers on a track system arranged on the top surface of the radial and/or peripheral connection members 5.

The radial and peripheral connection members 5, 9 and floating units 2, 3 may be provided with an outer insulation comprising a, to the pipe glued layer of cellular plastic, approximately 30 mm thick, covered by an outer layer of glass fiber armored plastic, approximately 8 mm, which withstands the weather conditions on the location during the expected lifetime of the construction.

The invention claimed is:

1. A floating platform comprising at least three floating or semi-submersible peripheral units arranged connected to a floating or semi-submersible central unit by at least one, in a substantially radial direction arranged, rigid and elongated radial connection member, wherein the floating or semi-submersible peripheral units are connected to the adjacent peripheral units by a coupling arrangement which is an elongated object variable in length arranged to allow each floating peripheral unit to move in relation to the adjacent peripheral units at least in a direction substantially parallel to the elongation direction of the coupling arrangement, wherein the length of at least one of the coupling arrangements is arranged to be adjusted by a length adjusting arrangement adapted to shorten the coupling arrangement and to pull two adjacent floating peripheral units towards each other.

2. The floating platform according to claim 1, wherein the coupling arrangement is a flexible wire, cord, cable, rope or similar object.

3. The floating platform according to claim 1, wherein the length adjusting arrangement is a winch comprising a winch drum where the coupling arrangement is arranged to be upwinded and rotation means is arranged to rotate said winch drum.

4. The floating platform according to claim 3, wherein the rotation means is powered by one of the following: electric, hydraulic, pneumatic or internal combustion drives.

5. The floating platform according to claim 1, wherein at least one of the coupling arrangements has a length of at least two times the nominal distance between the adjacent peripheral floating units.

6. The floating platform according to claim 5, wherein the coupling arrangement is arranged to run back and forth between the adjacent peripheral floating units at least one time.

7. The floating platform according to claim 1, wherein at least one of the coupling arrangements is a mechanical arrangement comprising at least two parts arranged telescopically moveable in relation to each other.

8. The floating platform according to claim 7, wherein the coupling arrangement is attached to the respective peripheral unit with an articulated joint.

9. The floating platform according to claim 1, wherein each floating peripheral unit comprises at least one semi-submersible node acting as a connection point for at least one coupling arrangement and at least one radial connection member.

10. The floating platform according to claim 1, wherein each floating peripheral unit comprises at least two semi-submersible nodes connected to each other by a rigid elongated peripheral connection member.

11. The floating platform according to claim 1, wherein the radially arranged connection members have a connection coupling in at least one end, connecting connection members with the central unit and/or the peripheral floating units and enabling relative movement between the central unit and peripheral floating units.

12. An energy producing plant comprising;
a floating platform according to claim 1,
an energy producing system,
an anchoring system arranged to anchor the floating platform to the bottom of an ocean.

13. The energy producing plant according to claim 12, wherein the energy producing system is at least one of; a wind power generator, wave power generator, sun cell or wind shovels.

14. The energy producing plant according to claim 12, wherein each floating peripheral unit comprises at least one semi-submersible node on which a wind power generator is mounted.

* * * * *